United States Patent [19]
Poola et al.

[11] Patent Number: 6,055,808
[45] Date of Patent: May 2, 2000

[54] METHOD AND APPARATUS FOR REDUCING PARTICULATES AND $NO_X$ EMISSIONS FROM DIESEL ENGINES UTILIZING OXYGEN ENRICHED COMBUSTION AIR

[75] Inventors: Ramesh B. Poola, Woodridge; Ramanujam R. Sekar, Naperville, both of Ill.

[73] Assignee: The University of Chicago, Chicago, Ill.

[21] Appl. No.: 09/102,232

[22] Filed: Jun. 22, 1998

[51] Int. Cl.[7] .................................................... F01N 3/00
[52] U.S. Cl. ............................... 60/274; 60/285; 60/289; 60/280; 123/585; 123/567; 123/26
[58] Field of Search .............................. 60/274, 285, 276, 60/303, 280, 286, 289; 123/302, 501, 503, 585, 567, 26, 316, 423, 669

[56] References Cited

U.S. PATENT DOCUMENTS

| | | |
|---|---|---|
| 5,051,113 | 9/1991 | Nemser . |
| 5,051,114 | 9/1991 | Nemser et al. . |
| 5,526,641 | 6/1996 | Sekar et al. ................................. 60/274 |
| 5,636,619 | 6/1997 | Poola et al. .............................. 123/585 |
| 5,640,845 | 6/1997 | Ng et al. ..................................... 60/274 |
| 5,649,517 | 7/1997 | Poola et al. ............................. 123/585 |
| 5,709,196 | 1/1998 | Coleman et al. ........................ 123/672 |
| 5,878,713 | 3/1999 | Kadota .................................... 123/305 |

*Primary Examiner*—Thomas Denion
*Assistant Examiner*—Binh Tran
*Attorney, Agent, or Firm*—Mason, Kolehmainen, Rathburn & Wyss

[57] ABSTRACT

An emission control system for reducing total particulates and $NO_X$ emissions from the exhaust of a diesel engine includes an air supply system that supplies oxygen enriched air to an air intake of the engine. The air supply system may include a selectively permeable air separating membrane device for producing the oxygen enriched air. In order to effectively utilize the increase in the concentration level of oxygen in the intake air, the amount of fuel being supplied to the diesel engine also is increased at a minimum in proportion to the increased concentration level of oxygen in the intake air. The increase in the amount of such fuel being supplied to the diesel engine can be adjusted by an electronic fuel injection system used on such diesel engines. In addition, the electronic fuel injection system is used to retard the injection timing of the engine.

17 Claims, 4 Drawing Sheets

METHOD AND APPARATUS FOR REDUCING PARTICULATES AND $NO_X$ EMISSIONS FROM DIESEL ENGINES UTILIZING OXYGEN ENRICHED COMBUSTION AIR

CONTRACTUAL ORIGIN OF THE INVENTION

The United States Government has rights in this invention pursuant to Contract No. W-31-109-ENG-38 between the United States Government and The University of Chicago.

BACKGROUND OF THE INVENTION

1. Field of the Invention

This invention relates to a method and apparatus for decreasing undesirable emissions in the exhaust of a compression ignition (diesel) engine, and more particularly, to a new and improved method and apparatus for decreasing total particulates and oxides of nitrogen ($NO_X$) from the exhaust of the diesel engine by introducing oxygen enriched air and an increased quantity of fuel and by retarding the injection timing of the diesel engine.

2. Background of the Invention

Compression ignition (diesel) engines typically have high exhaust emissions, such as particulates (for example, carbon soot and volatile organic compounds), visible smoke, and oxides of nitrogen ($NO_X$). Environmental Protection Agency (EPA) emissions standards for future automobiles, trucks and locomotive diesel engines require simultaneous reduction of $NO_X$ and total particulate emissions to very low levels. This tends to be difficult to achieve because of the inherent tradeoffs between lowering both total particulates and $NO_X$ emissions from a diesel engine. While it is possible in a diesel engine to reduce total particulate emissions and to improve power density performance by using oxygen enriched intake air, such oxygen enriched intake air tends to also increase the amount of $NO_X$ in the exhaust being emitted from the diesel engine.

In the case of both diesel and spark ignition engines, exhaust gas recirculation (EGR) systems have been used as one method of decreasing $NO_X$ emissions. When the gases from the EGR system are about 50% of the intake air, oxygen concentration is decreased from about 21% to about 14%. The decrease of $NO_X$ by the use of EGR systems tends to vary depending on the rate, temperature and water content of the EGR gases, injection timing, and air-fuel ratio of the intake to the engine. However, there are limits as to the amount of exhaust gases that can be reintroduced into the engine before power output and fuel economy are adversely affected. Such reintroduction of exhaust gases can also cause wear problems and oil contamination, particularly in the case of diesel engines where the recirculated gases include soot particles.

Other attempts have been made to control the amount of $NO_X$ being emitted from the exhaust of an engine. In order to control the amount of $NO_X$ actually generated by the engine, the amount of oxygen and nitrogen included in the intake of air of the engine has been controlled (see, for example, U.S. Pat. No. 5,649,517 that is assigned to the same assignee of record as the present application). On the other hand, attempts have been made to lower the level of $NO_X$ in such exhaust gases or emissions of an engine by injecting into the exhaust gases of the engine monatomic-nitrogen induced by a pulse arc (see, for example, U.S. Pat. Nos. 5,526,641 and 5,640,845 that are assigned to the same assignee of record as the present application). While these systems tend to decrease the level of $NO_X$ in engine exhaust gases, they do not tend to decrease the total particulates that are present in those exhaust gases.

Accordingly, it is an object of the present invention to provide a new and improved method and apparatus for decreasing both total particulates and $NO_X$ emissions in the exhaust of a diesel engine.

It is another object of the present invention to provide a new and improved method and apparatus for decreasing both total particulates and $NO_X$ emissions in the exhaust of a diesel engine while enhancing the power generated by the engine by introducing oxygen enriched air into the air intake of the engine and by increasing the quantity of fuel injected into the engine while simultaneously controlling (retarding) the engine injection timing.

It is yet another object of the present invention to provide a new and improved method and apparatus for reducing the amount of total particulates and $NO_X$ in the exhaust of a diesel engine while enhancing the power generated by the engine by introducing oxygen enriched air into the air intake of the diesel engine by diverting at least a portion of the intake air through a selectively permeable membrane so that ambient air and oxygen enriched air can be selectively supplied to the engine intake manifold, by increasing the amount of fuel introduced into the engine and by retarding the engine injection timing.

SUMMARY OF THE INVENTION

In accordance with these and many other objects of the present invention, an emission control system for a diesel engine embodying the present invention includes an air supply system that supplies oxygen enriched air to the intake of the engine. At least a portion of ambient air flowing from an air intake device is diverted so that the diverted air flows through a selectively permeable air separating membrane device. The ambient air being so diverted flows through the permeable membrane device due to a pressure differential established across the membrane device. This pressure differential can be established by a blower at the input of the membrane device and a vacuum pump at the output of the membrane device or alternatively, with a compressor at the input of the membrane device.

As the air flows from the blower through the permeable membrane device, a portion of the nitrogen in the ambient air is separated from the air so that oxygen enriched air (permeate) and nitrogen enriched air (retentate) are produced. The oxygen enriched air is supplied through the vacuum pump to the air intake of the engine along with ambient air from the air intake device. The nitrogen enriched air can be expelled to atmosphere. Depending on the engine design, the air being supplied to the intake manifold of the engine can be compressed by a compressor of a turbocharger and cooled by an inter-cooler. As a result, the air being supplied to the intake of the engine can be regulated so that an increased concentration level of oxygen is supplied to the air intake of the engine (for example, 23% to 25% oxygen by volume instead of ambient air which contains about 21% oxygen by volume).

In order to effectively utilize the increase concentration level of oxygen in the intake air, the amount of fuel being supplied to the diesel engine also should be increased. The increase in the amount of such fuel being supplied to the diesel engine can be adjusted by an electronic fuel injection system used on such diesel engines. For example, the amount of fuel being supplied can be increased at a minimum in proportion to the increase by weight of the oxygen in the intake air. While such increases in the oxygen in the intake air and the fuel tends to reduce the amount of total particulates in the exhaust being emitted from the diesel engine in part due to the increase temperature of combustion within the engine and also tends to increase the power being generated by the engine in part due the increase of fuel being combusted, the level of $NO_x$ being emitted from the engine tends to be undesirably increased. However, the level of $NO_x$ can be controlled by having the electronic fuel injection system retard the injection timing of the engine. By retarding the injection timing (i.e., delaying the time in the engine cycle when the fuel is injected into a cylinder), the length or duration of combustion is decreased resulting in less $NO_x$ being formed and emitted from the engine. For example, the injection timing could be retarded between 4 and 10 degrees of crankshaft angle. This retarding of the engine injection timing also tends to maintain the temperature within the cylinder at a more typical level and therefore pressure in the cylinder also is maintained at a typical level.

In one embodiment of the present invention, the intake air is supplied to the intake manifold of a diesel engine at an elevated pressure by means of a turbocharger driven by the energy obtained from the gases being exhausted from the exhaust manifold of the engine. In addition, a compound turbine can be driven by the energy obtained from the exhaust gases which are at an elevated temperature (higher energy state) due to the elevated amount of oxygen in the intake air. The energy generated by such a turbine can be supplied to the output shaft of the diesel engine thereby at least partially offsetting any energy used to operate the blower and vacuum pump that are used in connection with the permeable separation membrane. As a result, there will be only possibly a small increase in the fuel consumption and a small decrease in the power output of the engine due to the use of the permeable separation membrane.

BRIEF DESCRIPTION OF THE DRAWINGS

These and many other objects and advantages of the present invention will become readily apparent from consideration of the following detailed description of the embodiment of the invention shown in the accompanying drawing wherein.

DETAILED DESCRIPTION OF THE PREFERRED EMBODIMENT

Figure 1:
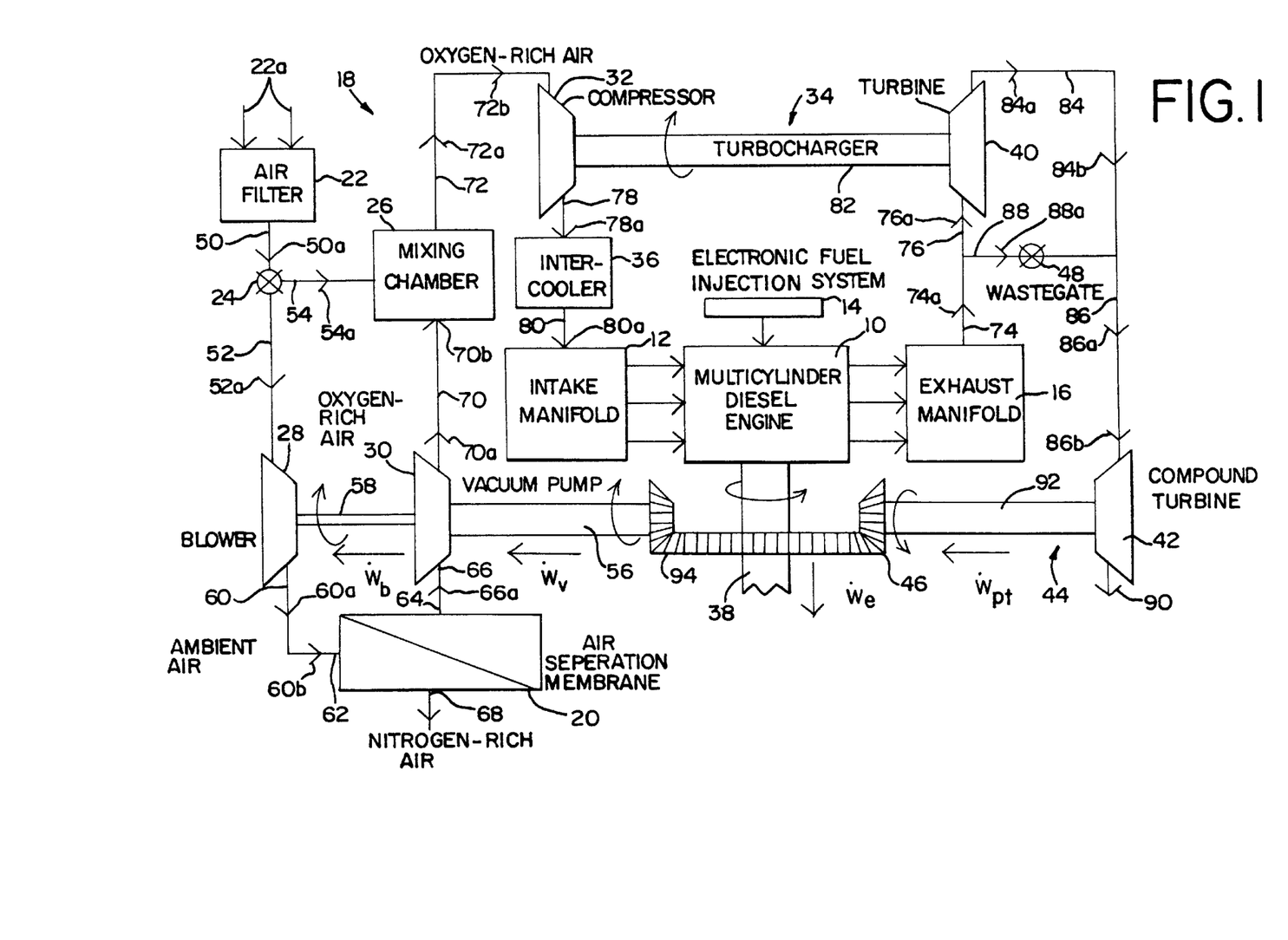
FIG. 1 is a diagrammatic illustration of a diesel engine with an emission control system which embodies the present invention.

Referring now more specifically to FIG. 1, therein is disclosed a diagrammatic representation of a diesel engine 10 having an intake manifold 12 through which air is supplied to the engine 10 to be combined in the engine 10 with combustible fuel supplied through an electronic fuel injection system 14. When the intake air and the fuel are combusted in the engine 10, exhaust gases are expelled from an exhaust manifold 16 in the engine 10. The exhaust gases flowing from the exhaust manifold 16 can contain a number of different pollutants including total particulates (carbon soot and volatile organics) and visible smoke and oxides of nitrogen ($NO_x$). In order to limit the amount of these undesirable emissions that are present in the exhaust gases being emitted from the engine 10 through the exhaust manifold 16, the engine 10 is provided with an emission control system that is generally designated by the reference numeral 18 and that embodies the present invention.

The emission control system 18 includes an oxygen enrichment or air separation membrane device 20 that separates nitrogen from ambient air flowing through the air separation membrane device 20 such that oxygen enriched air and nitrogen enriched air are produced. During the operation of the engine 10, ambient or atmospheric air flowing through an air filter or air intake device 22 flows through an air intake bypass valve 24 to a mixing chamber 26. In order to supply a mixture of oxygen enriched air and ambient air to the air intake manifold 12 during the operation of the engine 10, at least a portion of the ambient air flowing through the air filter 22 is diverted by the air intake bypass valve 24 so that such diverted air will flow to the air separation membrane 20 when a blower 28 and a vacuum pump 30 are actuated. A portion of the nitrogen in the ambient air diverted through the permeable membrane device 20 due to a pressure differential established across the membrane device 20 by the blower 28 and the vacuum pump 30 is separated from the ambient air so that oxygen enriched air (permeate) flows through the vacuum pump 30 to the mixing chamber 26.

The oxygen enriched air is mixed with ambient air within the mixing chamber 26 to the extent determined by the air intake bypass valve 24 such that oxygen enriched air is supplied to the intake manifold 12 of the engine 10 through a compressor portion 32 of a turbocharger 34 and an intercooler cooler 36. While the emission control system 18 is shown in FIG. 1 as utilizing the mixing chamber 26 for combining the oxygen enriched air from the membrane device 20 and ambient air, the emission control system 18 does not necessarily need to utilize such a mixing chamber 26. Instead, the oxygen enriched air generated by the membrane device 20 and ambient air can be supplied to the intake manifold 12 of the engine 10 in such proportions that the air entering the engine 10 will have the correct concentration of oxygen.

In either case, the oxygen enriched air is mixed with fuel supplied through the electronic fuel injection system 14 in the engine 10 so as to be combusted in the cylinders of the engine 10. The timing of the combustion is controlled by the electronic fuel injection system 14 and the combustion results in the rotation of an output shaft 38 with the exhaust gases being expelled from the engine 10 through the exhaust manifold 16. The exhaust gases being so expelled are at elevated temperatures and the energy of those exhaust gases are used to drive a turbine portion 40 of the turbocharger 34. The exhaust gases also can be used to drive a turbine portion 42 of a compound turbine 44, the output 46 of which supplies energy to the output shaft 38 of the engine 10 or alternatively to the blower 28 and the vacuum pump 30. A wastegate control valve 48 can be used to control the extent to which the exhaust gases flow to the turbine 40 and/or the turbine 42.

The oxygen level within the air being supplied to the intake manifold 12 of the engine 10 is at an increased concentration level as compared to the concentration of oxygen in ambient air. In order to effectively utilize this increased concentration level of oxygen in the intake air, the amount of fuel being supplied to the diesel engine 10 also is increased at a minimum in proportion to the increased level of oxygen in the intake air. The increase in the quantity of such fuel being supplied to the diesel engine 10 can be regulated by the electronic fuel injection system 14. While such increases in the oxygen in the intake air and the fuel tends to reduce the amount of total particulates in the exhaust gases being emitted from the diesel engine 10 through the exhaust manifold 16 in part due to the increase temperature of combustion within the engine 10 and also tends to increase the power being generated by the engine 10 in part due the increase of fuel being combusted, the level of $NO_X$ in those exhaust gases tends to be undesirably increased. However, the level of $NO_X$ can be controlled by having the electronic fuel injection system 14 retard the injection timing of the engine 10. By retarding the injection timing (i.e., delaying the time in the engine cycle when the fuel is injected into a cylinder), the length or duration of combustion is decreased resulting in less $NO_X$ being formed and emitted from the engine 10. This retarding of the engine injection timing also tends to maintain the temperature within the cylinder and therefore the cylinder pressure at relatively typical levels. It is this combination of increased concentration level of oxygen in the intake air (optimally, 23%–25% by volume) and the increased quantity of fuel along with the retarding of the injection timing that results in the decrease of both total particulates and $NO_X$ in the exhaust gases being emitted from the exhaust manifold 16 of the diesel engine 10. Moreover, the power being generated by the engine 10 also is improved due to the increased combustion of fuel in the engine 10.

As previously indicated, ambient air flowing into the air filter 22 (as represented by arrows 22a) flows through an air duct 50 (as indicated by an arrow 50a) to the air intake bypass valve 24. The air intake bypass valve 24 controls the amount of air flowing from the air filter 22 along an air duct 52 (as indicated by an arrow 52a) to the blower 28 and/or along an air duct 54 (as indicated by an arrow 54a) to the mixing chamber 26. In effect, the air intake bypass valve 24 will determine the oxygen level in the air mixed in the mixing chamber 26 because it controls the amount of ambient air flowing to the mixing chamber 26 through the duct 54 and the amount of ambient air flowing to the blower 28 and thereby to the air separation membrane 20 which produces oxygen enriched air and from which the oxygen enriched air is supplied through the vacuum pump 30 to the mixing chamber 26.

In order to provide the oxygen enriched air to the mixing chamber 26, the air intake bypass valve 24 is activated to permit some of the ambient air from the air filter 22 to flow along the air duct 52 as indicated by the arrow 52a. The flow of ambient air along the air duct 52 is caused by the actuation of the blower 28 and the vacuum pump 30 that produces a pressure differential across the air separation membrane 20. The blower 28 and the vacuum pump 30 can be mechanically driven as diagrammatically shown in FIG. 1 from energy supplied from the rotating shaft 38 of the engine 10 or the compound turbine 44 through turbine shafts 56 and 58 respectively. Alternatively, the blower 28 and the vacuum pump 30 can be driven by electric motors powered by the electrical system of the engine 10. With the blower 28 and the vacuum pump 30 so actuated and depending on the state of the air intake bypass valve 24, at least a portion of the air flowing into the air filter 22 will flow through the air duct 52 (as indicated by an arrow 52a), through the blower 28, through an air duct 60 (as indicated by arrows 60a and 60b) toward an input 62 of the membrane device 20. The ambient air flowing through the ducts 52 and 60 will flow toward the input 62 of the membrane device 20 due to the differential pressure that is established across the input 62 and an outlet 64 of the membrane device 20 by the blower 28 and the vacuum pump 30 with the pressure being higher at the input 62 as compared to the outlet 64. This differential in pressure across the membrane device 20 will result in the ambient air flowing into the input 62 and through the membrane device 20 so that oxygen enriched air will permeate from the higher pressure, upstream side of the membrane device 20 at the input 62 to the lower pressure, downstream side of the membrane device 20 at the outlet 64 and thereby to an outlet duct 66 and nitrogen enriched air will likewise flow out of an outlet 68 to atmosphere. Alternatively, the differential pressure across the input 62 and the outlet 64 of the membrane device 20 can be established with a compressor that pressurizes the input 62 of the membrane device 20 while the outlet 64 is maintained at atmospheric pressure.

The membrane device 20 is adapted to separate oxygen and nitrogen present in the air being supplied through the input 62 so as to produce oxygen enriched air (permeate) at the outlet 64 and nitrogen enriched air (retentate) at another outlet 68. The membrane device 20 can be of the type having a selectively permeable membrane that can separate or enrich gaseous mixtures. An example of such a membrane is disclosed in U.S. Pat. Nos. 5,051,113 and 5,051,114, both having been issued on Sep. 24, 1991. As indicated in those patents, such a membrane can be used to produce oxygen enriched air by separating oxygen and nitrogen present in the air. An example of one possible configuration for such a membrane device 20 is illustrated in FIGS. 6 and 7A–7C of U.S. Pat. No. 5,636,619 and FIGS. 3 and 3A–3C of U.S. Pat. No. 5,649,517, both of which patents are assigned to the assignee of the present application. Alternatively, any other suitable source of oxygen enriched air can be used in place of or in addition to the membrane device 20.

The particular percentage of oxygen contained within the air flowing out from the outlet 64 of the membrane device 20 and the particular percentage of nitrogen contained within the air flowing out from the outlet 68 of the membrane device 20 can be adjusted by providing the proper membrane device 20. In this regard, the membrane surface area and the pressure differential across the membrane device 20 will in part determine the amount of nitrogen separated from the ambient air flowing into the input 62 and thereby the percentage of oxygen within the air flowing out from the outlet 64. In general, the oxygen enriched air flowing from the outlet 64 of a membrane device, like the membrane device 20, may contain from about 23% to about 25% oxygen concentration by volume.

Once the oxygen enriched air is produced by the membrane device 20, it will flow from the outlet 64 through the air duct 66 (as indicated by an arrow 66a), through the vacuum pump 30 and through an air duct 70 (as indicated by arrows 70a and 70b) to the mixing chamber 26. The level of oxygen in the oxygen enriched air being supplied from the mixing chamber 26 via an air duct 72 (as indicated by arrows 72a and 72b) to the compressor 32 is in part dependent on the concentration of oxygen in the oxygen enriched air flowing from the outlet 64 of the air separation membrane 20 and in part dependent on the amount of ambient air that is supplied directly to the mixing chamber 26 through the air intake bypass valve 24 and the air duct 54 and through that valve 24 to the air separation membrane 20. As previously indicated, the mixing chamber 26 is not necessarily required because both oxygen enriched air and ambient air can be supplied to the intake manifold 12 of the engine 10 resulting in the proper concentration of oxygen enriched air being supplied to the engine 10. No matter how the oxygen enriched air is supplied to the engine 10, typically for engines 10 of the type with which the emission control system 18 is used the oxygen concentration by volume in the oxygen enriched air being supplied to the engine 10 will be increased to 23% to 25% by volume (this is compared to the concentration of oxygen in ambient air which is approximately 21% by volume).

The oxygen enriched air flowing in the air duct 72 is compressed (i.e., elevated in pressure) by the compressor portion 32 of the turbocharger 34. The turbine portion 40 of the turbocharger 34 is driven by the energy from the exhaust gases being emitted from the exhaust manifold 16 through an air duct 74 (as indicated by an arrow 74*a*) and an air duct 76 (as indicated by an arrow 76*a*). The energy from such exhaust gases that are at elevated temperatures is used to drive the turbine portion 40 of the turbocharger 34 such that a shaft 82 is rotated thereby driving the compressor portion 32. The compressor portion 32 compresses the intake air flowing through the air duct 72 such that the intake air flowing out from the compressor portion 32 through an air duct 78 (as indicated by an arrow 78*a*) to the inter-cooler 36 is at an appropriate elevated pressure when it flows out from the inter-cooler 36 via an air duct 80 (as indicated by an arrow 80*a*) and supplied to the intake manifold 12. The inter-cooler 36 is designed to act as a heat exchanger to cool the intake air flowing into the intake manifold 12. By cooling the intake air, $NO_X$ formed in the engine 10 tends to be decreased.

In view of the fact that the intake air has a higher concentration of oxygen than ambient air, the amount of fuel being supplied to the engine 10 by the fuel injection system 14 also should be increased. This increase in fuel quantity can be at a minimum proportional to the increase in the oxygen content of the intake air. For example, the fuel quantity can be increased by the ratio of the increase of the weight of oxygen in the intake air over the weight of oxygen in ambient air divided by the weight of oxygen in ambient air. If the quantity (weight) of fuel being supplied to the engine 10 when ambient air is used is "F1", the weight of oxygen in ambient air is "AA" and the weight of oxygen in the intake air is "AO", then the quantity (weight) "F2" of the fuel that should be supplied to the engine 10 by the fuel injection system 14 when oxygen enriched air is used could be determined by the following formula:

F2=F1×(AO/AA).

While increasing the concentration level of oxygen in the intake air being supplied to the engine 10 through the intake manifold 12 with a commensurate increase in the fuel being supplied to the engine 10 through the fuel injection system 14 tends to diminish the amount of total particulates in the exhaust gases flowing from the exhaust manifold 16 of the engine 10 and also tends to increase the power being generated by the engine 10 in part due the increase of fuel being combusted, the $NO_X$ in such exhaust gases tend to be at an undesirable elevated amount. This is due in part to the fact that the increase temperatures of combustion within the cylinders of the engine 10 tend to form more oxides of nitrogen in those exhaust gases. However, the amount of such $NO_X$ in those exhaust gases can be reduced by retarding the injection timing of the engine 10 in addition to increasing the concentration level of oxygen in the intake air and increasing the fuel quantity being supplied to the engine 10. The injection timing can be controlled by the electronic fuel injection system 14. The retarding of the injection timing effectively delays the time when fuel is injected in a cylinder of the engine 10. This delay lessens the combustion time and thereby decreases the amount of oxides of nitrogen that is formed during combustion. While the extent to which the injection timing is decreased depends on the concentration levels of oxygen in the intake air and the characteristics of the engine 10, a retarding of injection timing in the range of 4 to 10 degrees of crank angle would tend to be sufficient to aid in diminishing the amount of $NO_X$ present in the exhaust gases being emitted from the exhaust manifold 16 of the engine 10.

Figure 2:
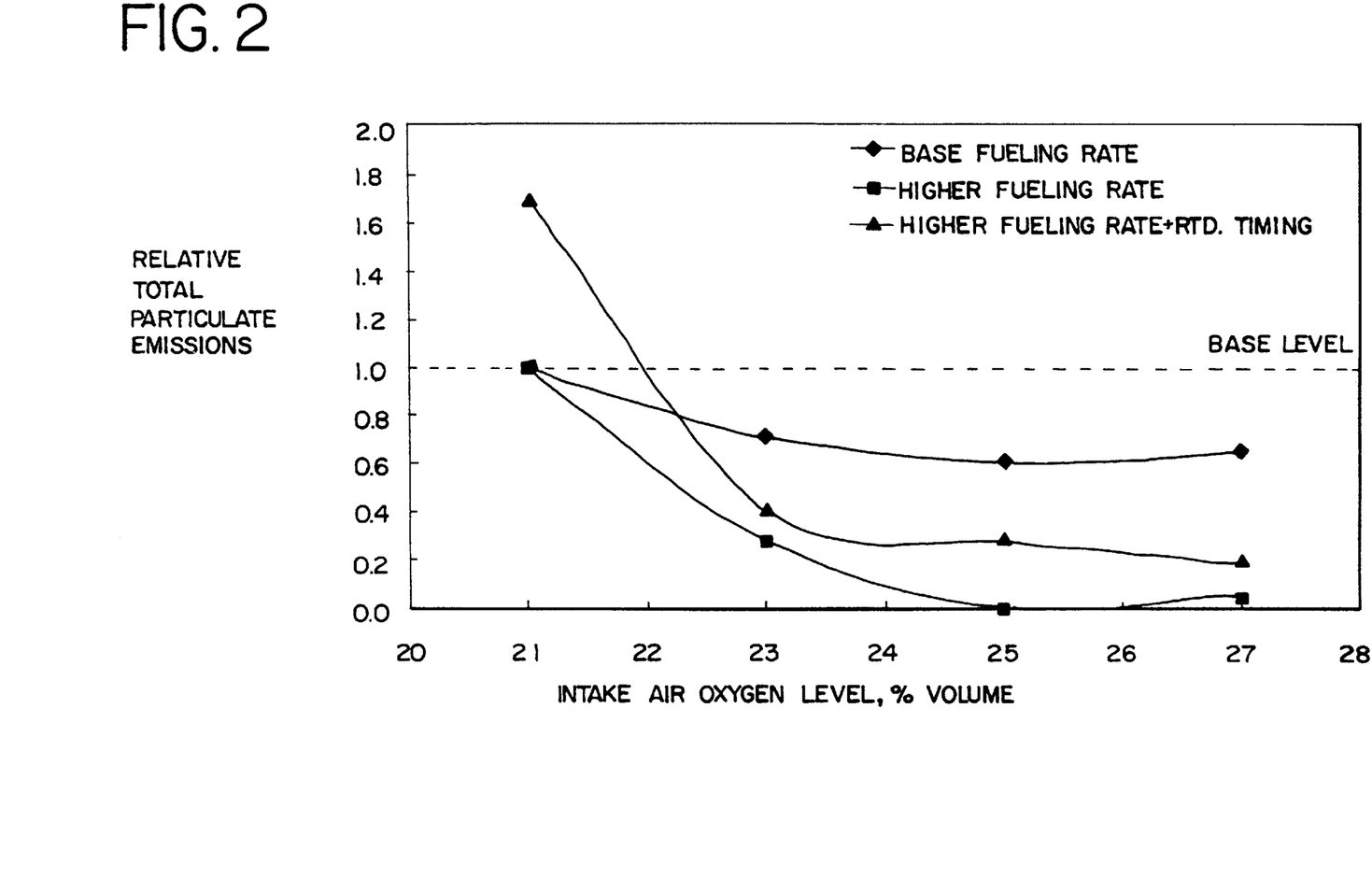
FIG. 2 is a graph showing how the level of total particulates in the exhaust of a typical diesel engine is affected by adjusting the level of oxygen in the air intake of the engine, adjusting the engine's fuel rate and adjusting the engine's injection timing.
Figure 3:
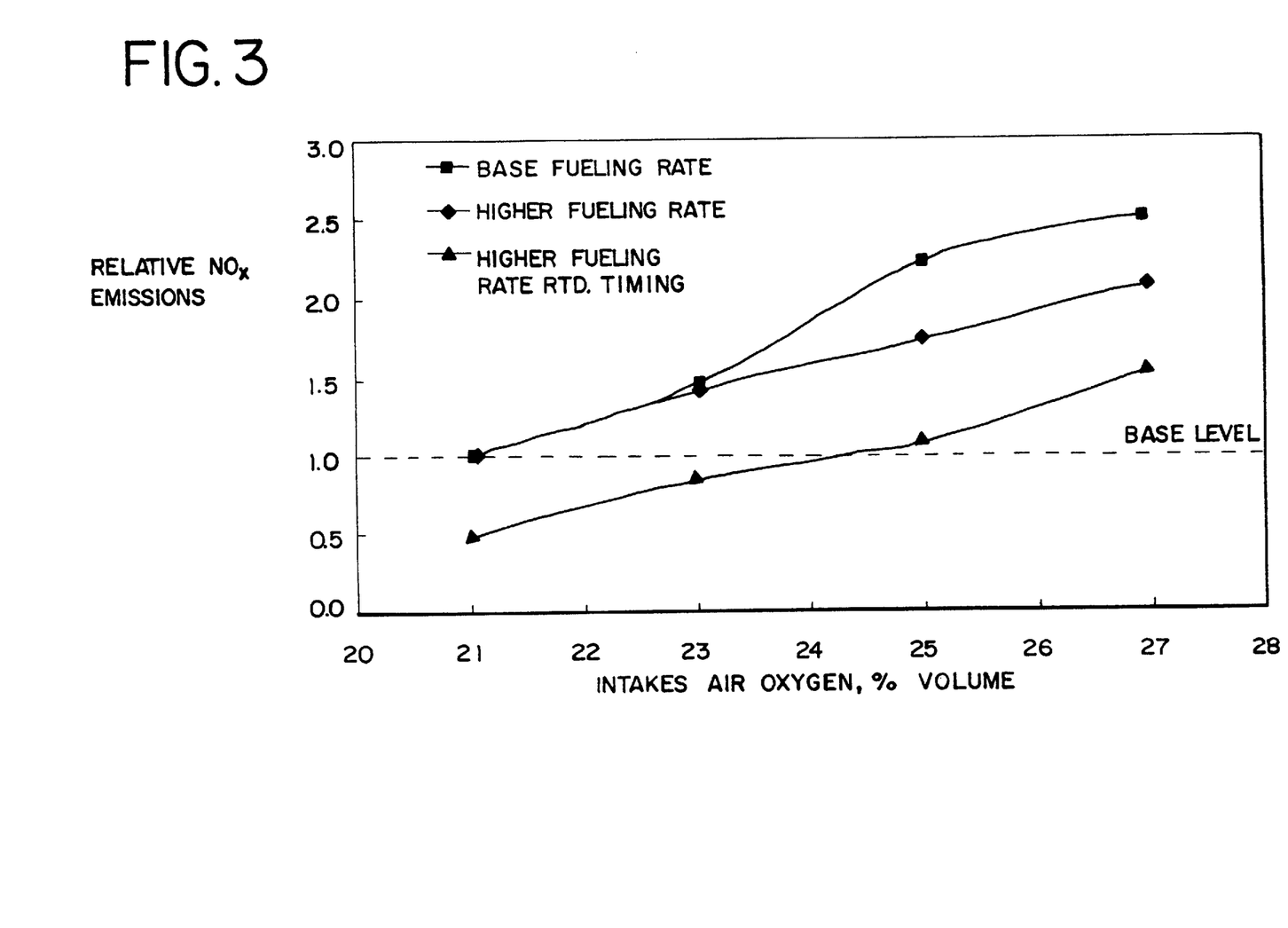
FIG. 3 is a graph showing how the level of $NO_x$ in the exhaust of a typical diesel engine is affected by adjusting the level of oxygen in the air intake of the engine, adjusting the engine's fuel rate and adjusting the engine's injection timing.
Figure 4:
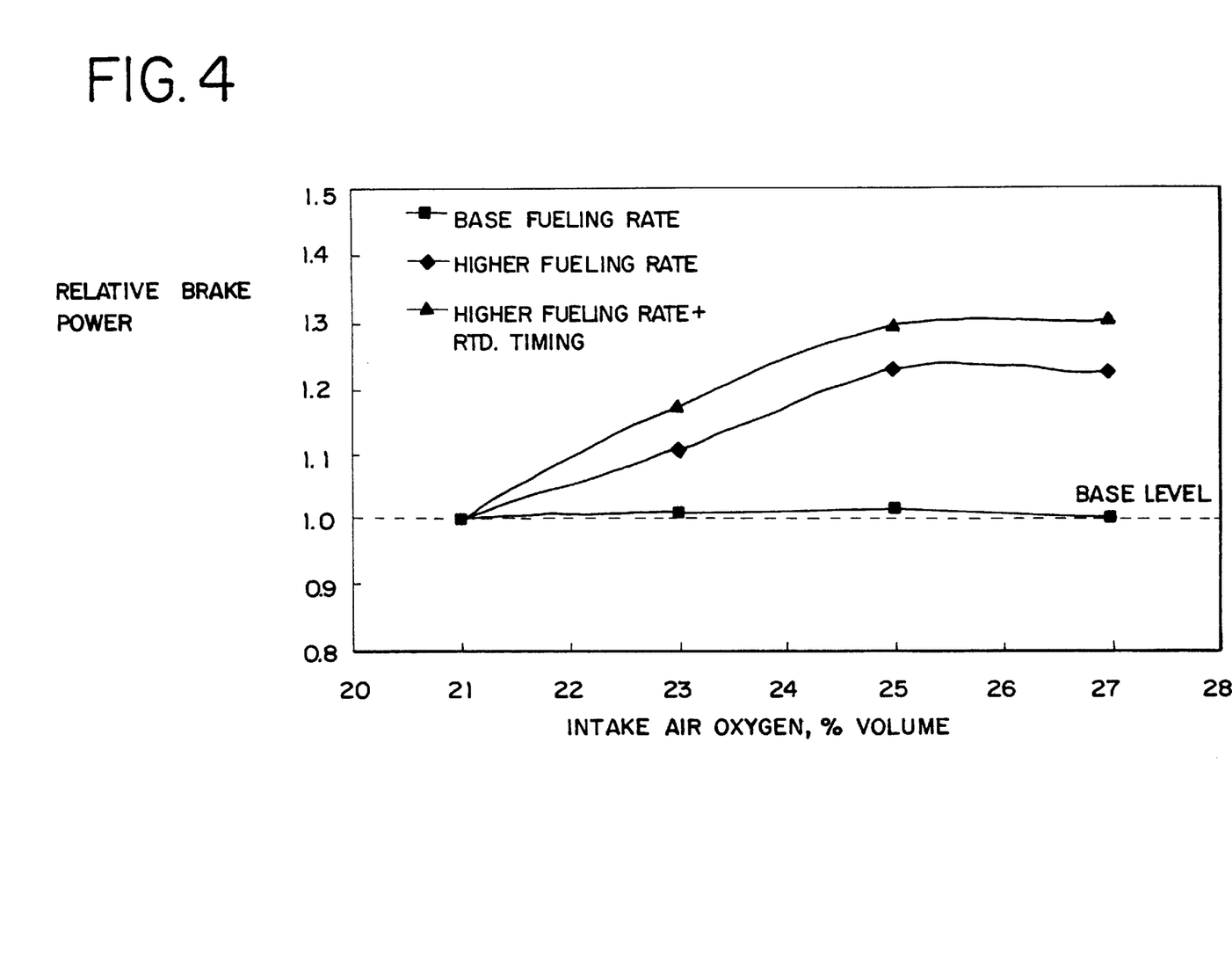
FIG. 4 is a graph showing how the power output from a typical diesel engine is affected by adjusting the level of oxygen in the air intake of the engine, adjusting the engine's fuel rate and adjusting the engine's injection timing.

In this regard, the graphs of FIGS. 2, 3 and 4 demonstrate how the increase in oxygen concentration in the intake air, the increase in fuel quantity and the retarding of injection timing can reduce both the total particulates and $NO_X$ simultaneously within the exhaust gases being emitted from the exhaust manifold 16 of the engine 10 and also increase the power being generated by the engine 10. These graphs are based on information from a typical two cylinder research (large bore, medium speed, two-stroke) diesel engine running at a full load.

Referring first to FIG. 2, that graph compares the amount of total particulates (shown on a relative scale or a normalized index above or below a base or index level) that is present in the exhaust gases of a diesel engine depending on the concentration level of oxygen (shown as a percentage of volume of the intake air) when a typical amount of fuel (base fueling rate) is supplied to the engine (diamond shaped points), when an increased amount of fuel (higher fueling rate) is supplied to the engine (square shaped points) and when both an increased amount of fuel is supplied and the injection timing is retarded (in the case of this graph, the injection timing was retarded approximately 7 degrees of crank shaft angle)(triangular shaped points). As can be discerned from the graph of FIG. 2, the amount of total particulates decrease in all cases when the concentration level of oxygen in the intake air is increased above the concentration level of oxygen in ambient air.

The graph of FIG. 3 similarly compares what is happening with respect to oxides of nitrogen ($NO_X$) (shown on a relative scale or normalized index above or below a base or index level) in the exhaust gases of a diesel engine depending on the concentration level of oxygen (shown as a percentage of volume of the intake air) when a typical amount of fuel (base fueling rate) is supplied to the engine (square shaped points), when an increased amount of fuel (higher fueling rate) is supplied to the engine (diamond shaped points) and when both an increased amount of fuel is supplied and the injection timing is retarded (in the case of this graph, the injection timing was retarded approximately 7 degrees of crank shaft angle)(triangular shaped points). As can be discerned from this graph, the amount of $NO_X$ in the exhaust gases tends to increase in all cases when the concentration level of oxygen in the intake air is increased. On the other hand, the graph of FIG. 3 does indicate that the amount of $NO_X$ in such exhaust gases are maintained at an acceptable level below a base level even when the oxygen level in the intake air is increased to around 23% of the volume of the intake air, the base fuel rate is increased and the injection timing of the engine is retarded. At that same level of oxygen concentration, the graph of FIG. 2 shows that the total particulates in the exhaust gases are at a relatively low level, well below a base or acceptable level, when the oxygen concentration of the intake air is at that same approximate 23% by volume, the base fuel rate is increased and the injection timing of the engine is retarded. Accordingly, the graphs of FIGS. 2 and 3 confirm that the levels of both total particulates and $NO_X$ in the exhaust gases of a diesel engine can be reduced to acceptable levels when the oxygen concentration of the intake air is increased modestly above the concentration of oxygen in ambient air (for example, increased to approximately 23% oxygen by volume), the amount of fuel being supplied to the engine is increased (for example, proportional to the increase in the amount of oxygen in the intake air) and the injection timing of the engine is retarded (for example, retarded by 7 degrees crank shaft angle).

The graph of FIG. 4 compares what is happening with respect to the brake power being generated by a typical diesel engine (shown on a relative scale or normalized index above or below a base or index level) depending on the concentration level of oxygen (shown as a percentage of volume of the intake air) when a typical amount of fuel (base fueling rate) is supplied to the engine (square shaped points), when an increased amount of fuel (higher fueling rate) is supplied to the engine (diamond shaped points) and when both an increased amount of fuel is supplied and the injection timing is retarded (in the case of this graph, the injection timing was retarded approximately 7 degrees of crank shaft angle)(triangular shaped points). As can be discerned from this graph, the power output from the engine tends to increase as the amount of fuel being combusted within the engine increases. In the case where the oxygen level in the intake air is increased to around 23%–25% of the volume of the intake air, the base fuel rate is increased and the injection timing of the engine is retarded, the output power is increased above the base level or the level of output power of a normally running engine. Consequently, the graphs of FIGS. 2, 3 and 4 indicate that the output of the engine can be increased while the total particulates and the $NO_X$ in the exhaust gases are maintained at a relatively low level, well below a base or acceptable level, when the oxygen concentration of the intake air is increased modestly above the concentration of oxygen in ambient air (for example, increased to approximately 23% oxygen by volume), the amount of fuel being supplied to the engine is increased (for example, proportional to the increase in the amount of oxygen in the intake air) and the injection timing of the engine is retarded (for example, retarded by 7 degrees crank shaft angle).

While the use of the emission control system 18 aids in reducing both the total particulates and the $NO_X$ present in the exhaust gases being expelled from the exhaust manifold 16 of the engine 10, a certain amount of additional energy over the energy normally needed to operate the engine 10 is needed in order for the oxygen to be produced by the membrane device 20. As previously discussed, the blower 28 and the vacuum pump 30 create a sufficient differential pressure across the separation membrane device 20 so that the resulting oxygen enriched air can be supplied to the mixing chamber 26 and then to the intake manifold 12 of the engine 10. At least some of this additional energy can be provided by the compound turbine 44. As also previously discussed, the exhaust gases being expelled from the exhaust manifold 16 flow along the air duct 74 (as indicated by the arrow 74a) and the air duct 76 (as indicated by the arrow 76a) through the turbine portion 40 of the turbocharger 34. These exhaust gases are at elevated temperatures (in fact, the temperatures tend to be higher than normal due to the increase of oxygen in the intake air) so that energy can be imparted to the turbine portion 40 of the turbocharger 34 from this exhaust gas. The exhaust gases flow out from the turbine portion 40 through an air duct 84 (as indicated by arrows 84a and 84b) and through another air duct 86 (as indicated by arrows 86a and 86b) to the turbine portion 42 of the compound turbine 44. The amount of and the temperature of the exhaust gases flowing to the compound turbine 44 can be controlled to some extent by the wastegate control valve 48. When that wastegate control valve 48 is opened to at least some extent, a portion of the exhaust gases flowing in the air duct 74 directly from the exhaust manifold 16 will be diverted along an air duct 88 (as indicated by an arrow 88a) and then to the air duct 86 so that the diverted exhaust gases will flow as indicated by the arrows 86a and 86b along the air duct 86 to the turbine portion 42 of the compound turbine 44.

The energy contained in the exhaust gases being expelled from the exhaust manifold 16, particularly in view of the elevated temperatures of those gases caused by the increased levels of oxygen in the intake air of the engine 10, can be used in driving the turbine 42 of the compound turbine 44. In this regard, the exhaust gases flow through the turbine portion 42 and then is exhausted to atmosphere as indicated by an arrow 90. While the disclosed embodiment of the emission control system 18 shown in FIG. 1 indicates that a compound turbine 44 can be used to add to the energy of the crankshaft 38, other devices can be used such as a positive screw expander, turbochargers, and other bottoming cycles that can convert the energy in the exhaust gases into mechanical energy. The amount of energy generated by the compound turbine 44 is partly dependent on the amount of the exhaust gases that are supplied directly from the exhaust manifold 16 under the control of the wastegate control valve 48 as opposed to the exhaust gases that first flow through the turbine 40.

In the case of the compound turbine 44, the amount of energy produced by the turbine 42 and imparted to a shaft 92 and thereby through the output 46 to the crankshaft 38 is represented in FIG. 1 as $W_{pt}$. The amount of energy being imparted to the crankshaft by both the engine and the compound turbine 44 is represented in FIG. 1 as $W_e$. On the other hand, the amount of energy being taken from the crankshaft 38 at an output 94 to drive the vacuum pump 30 through the shaft 56 is represented in FIG. 1 as $W_v$ and to drive the blower 28 through the shaft 58 as $W_b$. Ideally, $W_{pt}$ should be equal to or greater than the sum of $W_v$ and $W_b$ so that the total amount of energy $W_e$ will not be decreased due to the emission control system 18. Even if the amount of energy $W_e$ imparted to the crankshaft 38 is decreased slightly, that decrease in energy is offset by the advantage of decreasing the amount of total particulates and $NO_X$ in the exhaust gases being expelled to the atmosphere from the engine 10.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An emission control system for a combustion engine to limit pollutants in exhaust gases emitted from an exhaust of said engine, said emission control system comprising:

a source of oxygen enriched air in fluid communication with an air intake of said engine, said oxygen enriched air being supplied to said air intake contains approximately 23%–25% oxygen concentration by volume; and a fuel and timing control system, said fuel and timing control system controlling the amount of fuel being supplied to said engine such that the amount of fuel is increased at a minimum in proportion to the amount of oxygen in said oxygen enriched air and the injection timing of said engine is retarded approximately 4–10 degrees of crank shaft angle.

2. An emission control system as set forth in claim 1 wherein said source of oxygen enriched air is a selectively permeable membrane for producing oxygen enriched air that is supplied to said air intake.

3. An emission control system as set forth in claim 2 wherein said membrane produces oxygen enriched air containing about 23%–25% oxygen concentration by volume.

4. An emission control system as set forth in claim 2 including an exhaust driven device for supplying energy from said exhaust gases so as to enable said membrane to produce said oxygen enriched air.

5. An emission control system as set forth in claim 2 including a pressure differential means associated with said membrane to establish a differential pressure across said membrane so that ambient air flows through said membrane and one of the products of said membrane is oxygen enriched air.

6. An emission control system as set forth in claim 5 wherein said pressure differential means includes a blower for producing an elevated pressure at an input of said membrane and a vacuum pump associated with an output of said membrane from which said oxygen enriched air flows.

7. An emission control system as set forth in claim 6 wherein said blower and said vacuum pump are mechanically driven at least in part by a driving means driven by energy from said exhaust gases being emitted from said exhaust of said engine.

8. An emission control system as set forth in claim 1 including a mixing chamber in fluid communication with said air intake, said mixing chamber receiving ambient air and said oxygen enriched air from said source of oxygen enriched air and supplying a mixture thereof to said air intake.

9. An emission control system as set forth in claim 8 wherein said mixture of oxygen enriched air and ambient air contains about 23%–25% oxygen concentration by volume.

10. An emission control system as set forth in claim 1 wherein said fuel and timing control system retards said injection timing of said engine approximately 7 degrees of crank shaft angle.

11. A method of reducing the amount of oxides of nitrogen and particulates in gases being emitted from an exhaust of an internal combustion engine, said method comprising:

supplying oxygen enriched air contains approximately 23%–25% oxygen concentration by volume to an air intake of said engine;

supplying an increased amount of fuel to said engine in proportion to the amount of oxygen in said oxygen enriched air; and retarding the injection timing of said engine approximately 4–10 degrees of crank shaft angle.

12. A method as set forth in claim 11 wherein said oxygen enriched air is supplied by a selectively permeable membrane.

13. A method as set forth in claim 12 wherein a blower and a vacuum pump maintain a differential pressure across said permeable membrane.

14. A method as set forth in claim 11 wherein said fuel being supplied to said engine is at a minimum in proportion to the weight of oxygen in said oxygen enriched air as compared to the weight of oxygen in ambient air.

15. A method of reducing the amount of oxides of nitrogen and particulates in gases being emitted from an exhaust of a diesel engine and increasing the amount of output power from said engine, said method comprising:

producing oxygen enriched air by processing ambient air through a selectively permeable membrane;

mixing said oxygen enriched air from said membrane with ambient air so as to have a resulting oxygen enriched air with approximately 23%–25% oxygen concentration by volume;

supplying said resulting oxygen enriched air into an air intake of said engine;

supplying an increased amount of fuel to said engine at a minimum in proportion to the amount of oxygen in said oxygen enriched air; and retarding the injection timing of said engine approximately 4–10 degrees of crank shaft angle.

16. A method as set forth in claim 15 wherein said fuel being supplied to said engine is at a minimum in proportion to the weight of oxygen in said resulting oxygen enriched air as compared to the weight of oxygen in ambient air.

17. A method as set forth in claim 15 wherein a differential pressure is maintained across said permeable membrane so that said oxygen enriched air will be produced.

\* \* \* \* \*